No. 710,742. Patented Oct. 7, 1902.
R. BIRKHOLZ, Dec'd.
J. W. BIRKHOLZ, Administrator.
BOTTLE WASHING MACHINE.
(Application filed Dec. 31, 1900.)
(No Model.) 7 Sheets—Sheet 3.

No. 710,742. Patented Oct. 7, 1902.
R. BIRKHOLZ, Dec'd.
J. W. BIRKHOLZ, Administrator.
BOTTLE WASHING MACHINE.
(Application filed Dec. 31, 1900.)

(No Model.) 7 Sheets—Sheet 4.

No. 710,742. Patented Oct. 7, 1902.
R. BIRKHOLZ, Dec'd.
J. W. BIRKHOLZ, Administrator.
BOTTLE WASHING MACHINE.
(Application filed Dec. 31, 1900.)
(No Model.)
7 Sheets—Sheet 5.

No. 710,742. Patented Oct. 7, 1902.
R. BIRKHOLZ, Dec'd.
J. W. BIRKHOLZ, Administrator.
BOTTLE WASHING MACHINE.
(Application filed Dec. 31, 1900.)
(No Model.) 7 Sheets—Sheet 6.

UNITED STATES PATENT OFFICE.

RICHARD BIRKHOLZ, OF MILWAUKEE, WISCONSIN; JULIUS W. BIRKHOLZ, ADMINISTRATOR OF SAID RICHARD BIRKHOLZ, DECEASED, ASSIGNOR TO ANNA BIRKHOLZ, JULIUS W. BIRKHOLZ, EDWIN R. BIRKHOLZ, AND IRMA BIRKHOLZ, OF MILWAUKEE, WISCONSIN.

BOTTLE-WASHING MACHINE.

SPECIFICATION forming part of Letters Patent No. 710,742, dated October 7, 1902.

Application filed December 31, 1900. Serial No. 41,591. (No model.)

*To all whom it may concern:*

Be it known that I, RICHARD BIRKHOLZ, a citizen of the United States, residing at Milwaukee, in the county of Milwaukee and State of Wisconsin, have invented certain new and useful Improvements in Bottle-Washing Machines, of which the following is a specification, reference being had to the accompanying drawings, forming a part thereof.

The main objects of my invention are to thoroughly wash and rinse bottles inside or both inside and outside automatically to avoid the objections incident to moving the rotary brush-spindles endwise to prevent the rapidly-rotating brush-spindles from throwing water, and generally to simplify and improve the construction and operation of machines of this class.

It consists in certain novel features of construction and arrangement of parts and in the combination of parts hereinafter particularly described, and pointed out in the claims.

In the accompanying drawings like letters designate the same parts in the several figures.

Figure 1:
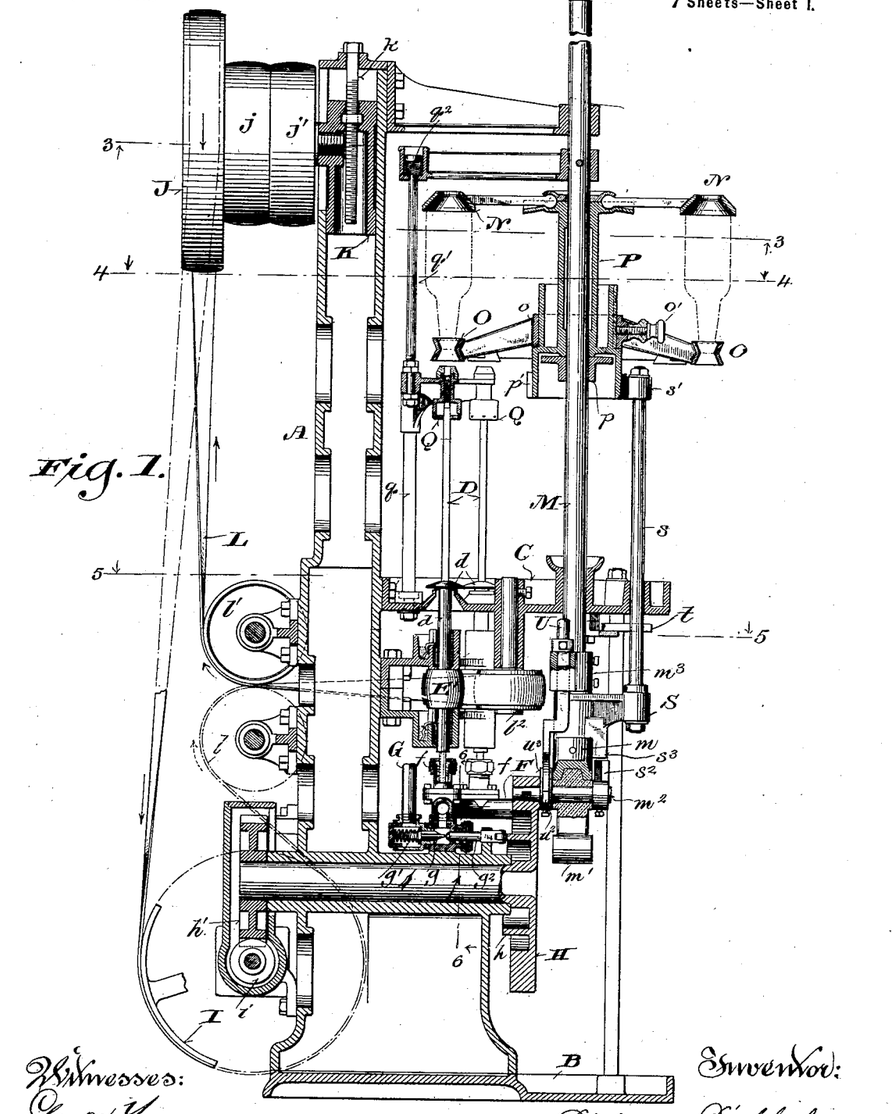
Figure 1 is a vertical medial section from front to rear on the line 1 1, Fig. 2, of a machine embodying some of my improvements.
Figure 2:
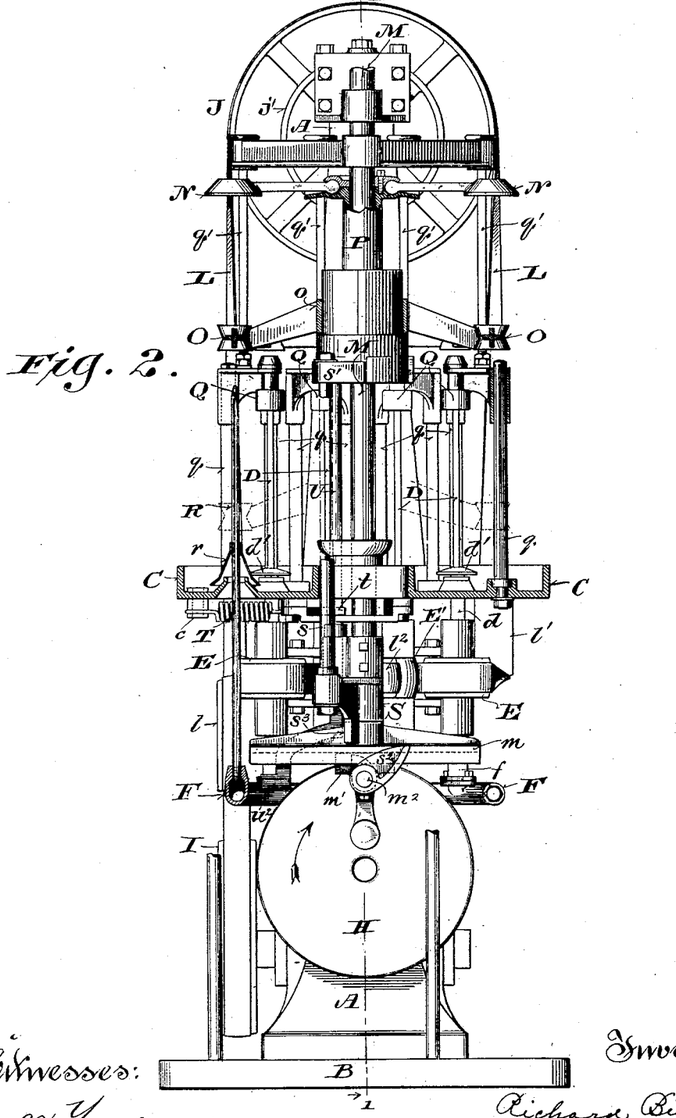
Fig. 2 is a front elevation of the same.
Figure 3:
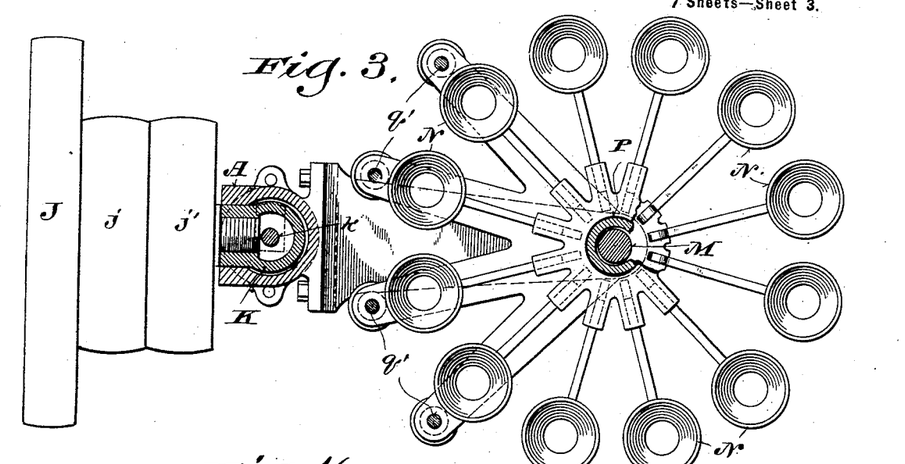
Fig. 3 is an enlarged horizontal section on the line 3 3, Fig. 1, showing the upper part of the bottle-carrier inverted.

Referring to Figs. 1 to 8, inclusive, and more particularly to Figs. 1 and 2, A designates the main frame, which is preferably cast in the form of an upright column enlarged at the lower end and provided with a base B.

C is a horizontal table attached on one side to the column A and formed with an upturned marginal flange for holding water, which is conducted off through a waste opening or connection $c$.

Figure 6:
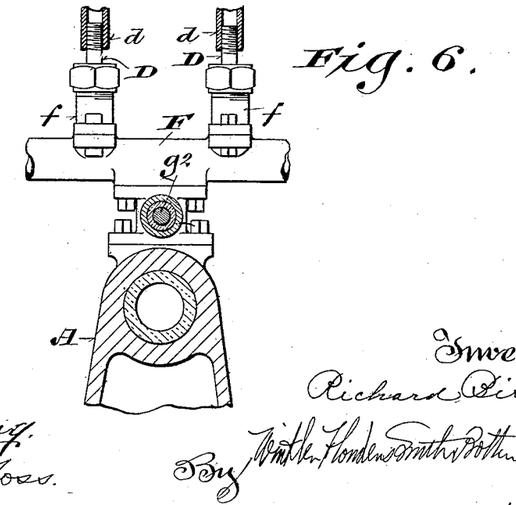
Fig. 6 is a vertical cross-section on the line 6 6, Fig. 1, showing the water-supply connection of the brush-spindles and injecting-nozzles.

D D are vertical rotary brush-spindles which project upwardly through flanged openings in the table C and are provided below said table with pulleys E E'. Sections $d\ d$ of said spindles, on which said pulleys are mounted and which are supported above and below said pulleys in self-oiling bearings, are made heavier than the remaining portions of said spindles. At their lower ends the brush-spindles pass through stuffing-boxes $f\ f$, into open communication with a curved horizontal pipe or header F, as shown in detail in Fig. 7. The pipe or header F has a water-supply connection G, controlled by a valve $g$, which is normally closed by a spring $g'$ and arranged to be intermittently opened, as hereinafter explained, by a sliding rod $g^2$, passing through a stuffing-box on one side of the valve-case in line with the valve-stem, as shown in Figs 1 and 6. The outer end of the rod $g^2$, which is provided with a friction-roller, is engaged by a cam $h$, formed on a crank-wheel H, which is fixed on the front end of a horizontal shaft provided at its rear end with a worm-gear $h'$, meshing with a worm $i$ on a horizontal shaft at right angles to the crank-shaft and provided with a pulley I.

J is a driving-pulley loosely mounted with tight and loose pulleys $j$ and $j'$, at right angles to the plane of the pulley I, upon a rearwardly-projecting stud carried by a vertically-movable slide K in the upper end of the column A. The machine is connected by the pulleys $j\ j'$ and a belt with any convenient source of power, and the power communicated to it by said belt is transmitted through the pulley J, which is attached to the tight pulley $j$, to all the moving parts of the machine through a single belt L, which passes from the pulley J around the pulley I, thence upwardly over an idler $l$, directly above the pulley $i$, thence around the pulleys E E' on the brush-spindles, thence around an idler $l'$, parallel with the idler $l$, and thence back to the pulley J. The slide K is moved up and down and held in place in the column A by a screw $k$, which serves as a belt-tightener. In the machine shown in the drawings there are four brush-spindles, the two outer spindles being provided with bristle brushes, as shown at the left in Fig. 7, for washing the bottoms of bottles and the two inner spindles being provided with rubber brushes or slit rubber tubing, as shown at the right in Fig. 7, for washing the necks and bodies of bottles inside; but the number and relative arrangement of the brushes may be varied. When an even number of brushes is employed, an extra idler $l^2$ is required, so that the belt may be run alternately in opposite directions around the pulleys on the brush-spindles. In the machine shown in the drawings the idler $l^2$ is mounted on a depending stud secured in the table C, between and in front of the two middle brush-spindles.

Figure 5:
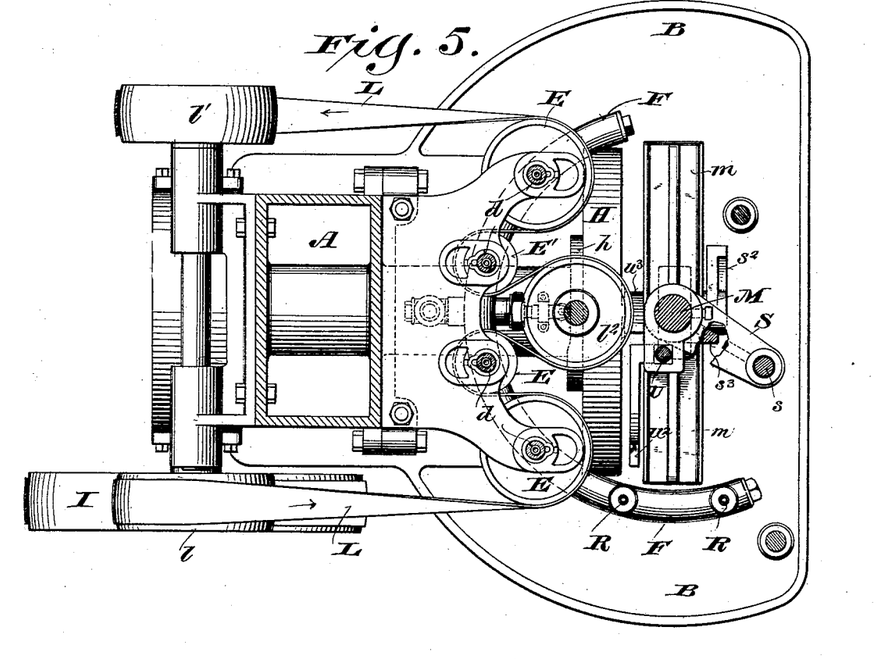
Fig. 5 is a similar section on the line 5 5, Fig. 1.

As bristle brushes have been found most effective for washing the bottoms of bottles and rubber brushes the most effective for washing the necks and bodies, I provide my machine with both bristle and rubber brushes so arranged that each bottle will be subjected successively to the action of both bristle and rubber brushes. In order that the strips of the rubber brushes may be thrown by centrifugal action forcibly outward against the inner surface of the bottles and effectively rub them, it is necessary to rotate such brushes at a higher rate of speed than is desirable for the bristle brushes. The spindles of the bristle brushes are therefore provided with larger pulleys E than the pulleys E' employed on the spindles of the rubber brushes, as shown in Fig. 5.

M is a vertically-movable rod supported by bearings in the table C and in an arm on the upper end of the column A parallel with the brush-spindles D. It is provided at its lower end with a grooved cross-head or yoke $m$ in the path of a weighted block $m'$, loosely mounted on the crank-pin $m^2$ of the cam and crank-wheel H. Upon this rod, above the table C, is revolubly mounted a bottle-carrier, which consists of upper and lower tapering chucks or holders N and O, connected by radiating arms with a sleeve P, through which the rod M passes and which bears loosely at its lower end on a collar $p$, fixed to said rod. The chucks or holders N and O are arranged at regular intervals in circles one above the other upon the sleeve P to correspond exactly with the arrangement of the brush-spindles, and they are adapted to hold bottles in an inverted position, as indicated by dotted lines in Fig. 1 and shown by full lines in Fig. 7, and to present them successively as the carrier is turned directly over and in line with the brush-spindles. The upper chucks or holders N have separate jointed connections with the sleeve P, so as to allow them to yield upwardly and automatically adapt themselves to slight variations in the length or size of bottles. The lower chucks O are rigidly connected with a collar $o$, which is vertically adjustable on an enlarged cylindrical rim formed concentrically with the sleeve P and held in adjusted position thereon by a set-screw $o'$ for bottles of different sizes, such as quart and pint bottles.

Figure 4:
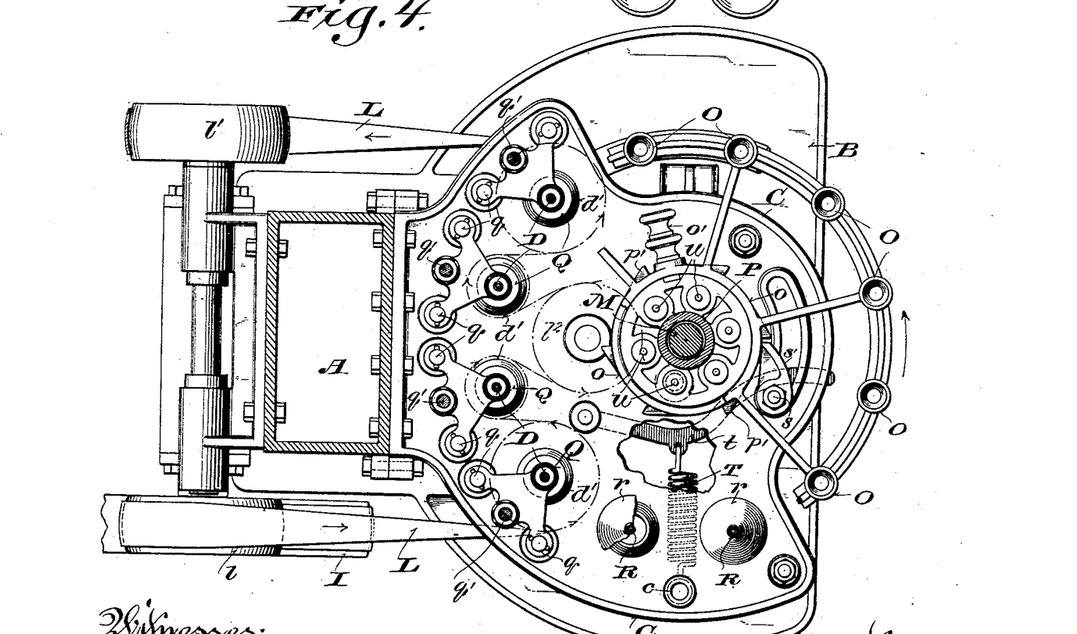
Fig. 4 is an enlarged horizontal section on the line 4 4, Fig. 1.
Figure 7:
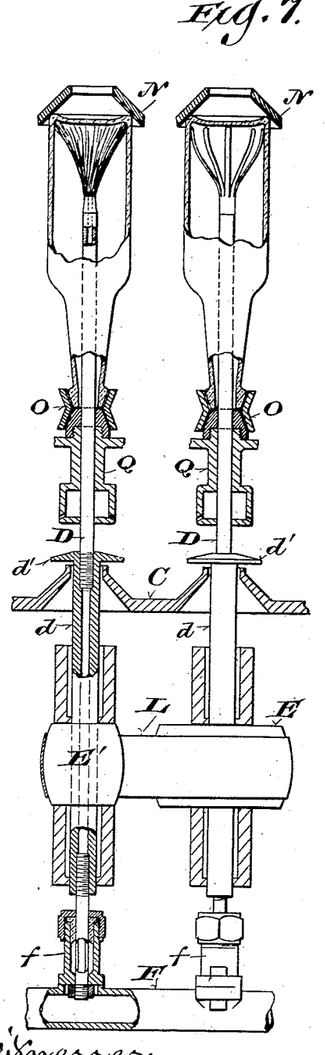
Fig. 7 is a vertical section, on a still larger scale, showing bristle and rubber brushes in operation and associated parts of the machine.

Q Q are vertically-movable sleeves or muffs, through which the brush-spindles are guided into the bottles when the bottle-carrier is lowered, as shown in Fig. 7, and which are drawn upwardly over and envelop the brushes when the bottle-carrier is elevated, as shown in Figs. 1 and 2. These guiding-sleeves are held in the proper relation to the brush-spindles by guide-rods $q$, secured at their lower ends in the table C, parallel with said brush-spindles, and they are moved up and down on said guide-rods by vertical rods $q'$, which have a vertically-yielding connection at their upper ends with arms rigidly secured to the rod M above the bottle-carrier. The yielding connections between the rods $q'$ and the rigid arms on the rod M may consist, as shown in Fig. 1, of springs $q^2$, interposed between heads on the upper ends of said rods $q'$ and said arms. The muffs Q are provided at their upper ends with cones which fit into conical recesses in the lower ends of the chucks O when the bottle-carrier is lowered, and thus serve, with the tapering recesses in the upper ends of said chucks, which receive the heads of the bottle, and with the tapering recesses in the chucks N, which receive the bottoms of the bottles, to exactly center and hold the bottles securely in line with the brush-spindles when the bottle-carrier is lowered. Chambers having outwardly-directed waste-openings are formed in the lower ends of the muffs Q to catch the water which runs down on the brush-spindles from the bottles into the muffs and prevent the same from being thrown off in all directions from the brush-spindles below the muffs by centrifugal force. The water caught in these chambers is discharged through the waste-openings therein upon the table C, from which it is conducted off through the waste connection $c$. The upper ends of the guide-rods $q$, which pass loosely through guiding-collars formed with the muffs Q, are provided, as shown in Figs. 2 and 4, with cotters or cross-pins, which serve as stops by engagement with said collars to limit the upward movement of the muffs just before the bottle-carrier reaches the limit of its upward movement. In this way the lower chucks or holders O are lifted clear of the centering-cones on the upper ends of the muffs when the bottle-carrier is elevated to its limit, so that it may be turned.

R R are vertical injecting-nozzles connected at their lower ends with the pipe or header F for rinsing the bottles after they have been subjected to the action of the brushes.

The brush-spindles D are provided, as shown in Figs. 1, 2, and 7, above the openings through which they pass in table C, with deflectors $d'$, which project over said openings and prevent any water flowing down from the muffs upon the spindles from passing below the table and coming in contact with the belt L. The nozzles R are also provided, as shown in Figs. 2 and 4, with similar deflectors $r$ for a like purpose. The deflectors $r$ are, however, more sharply beveled or tapered than the deflectors $d'$, since the nozzles R are stationary, while the brush-spindles are rapidly rotated and cause the deflectors $d'$ to throw the water therefrom by centrifugal force.

Figure 8:
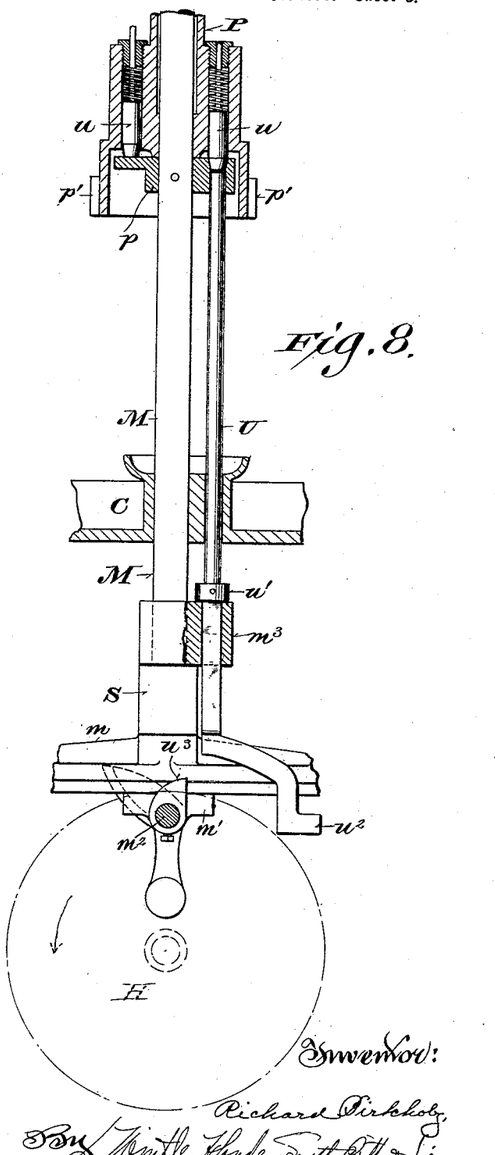
Fig. 8 is a detail view, in vertical section, showing the locking devices for holding the bottle-carrier in different positions and means for unlocking said carrier and allowing it to be turned intermittently.

To turn the bottle-carrier when it is lifted clear of the muffs Q, an arm S is loosely mounted on the lower end of the rod M, between yoke $m$ and a collar $m^3$, and in the outer end of this arm is secured the lower end of a vertical rod S, which passes upwardly through a curved opening in the table C and is provided at its upper end with a pawl $s'$. This pawl is held in yielding engagement with a ratchet-wheel $p'$ on the lower end of the sleeve P of the bottle-carrier, as shown in Figs. 1 and 4. A cam $s^2$, fixed on the crank-pin $m^2$, is adapted to engage with a projection $s^3$ on the under side of the arm S when said crank-pin passes through the upper part of its revolution, and thus turn the bottle-carrier in the direction indicated by the arrow on Fig. 4 an interval. The arm S, with the rod $s$ and pawl $s'$, is returned to its initial position by a spring T, connected with a lever T, which is fulcrumed at one end to the under side of the table C and bears at its opposite end against the rod $s$, as shown in Figs. 2 and 4. To stop and hold the carrier with the bottles exactly over the brush-spindles and injecting-nozzles, the sleeve P is provided at its lower end, as shown in Figs. 4 and 8, with a number of spring-actuated pins or bolts $u$, arranged in a circle concentrically around and parallel with the rod M. The lower ends of these bolts bear upon the collar $p$, which is provided with a single socket, with which they engage successively as the carrier is turned from one position into another by the pawl $s'$. To disengage these locking bolts or pins from the collar $p$ and release the bottle-carrier, so that it can be turned forward when it is elevated clear of the muffs Q, a vertical rod U is arranged parallel with the rod M, in line with the socket in the collar $p$, into which it projects at its upper end, as shown in Fig. 8. This rod extends downwardly through the table C and has a bearing in the collar $m^3$. It is limited in its downward movement by a collar $u'$, which normally rests upon the collar $m^3$ and is provided at its lower end with a shoe $u^2$ in the path of a cam $u^3$, which is fixed on the crank-pin $m^2$, as shown in Figs. 1 and 5.

With the arrangement of brushes and injecting-nozzles shown in the drawings the mechanism for turning the bottle-carrier is designed to move said carrier every time it is lifted into its upper position an interval corresponding with twice the distance between adjacent brushes, so that each bottle will be moved from one brush past the next brush into position to descend over and be washed by the third brush. In this way each bottle will be successively washed by each of the two kinds of brushes and finally rinsed by one of the nozzles R. The carrier in the machine illustrated in the drawings is provided with holders for twelve bottles and, as shown in Fig. 4, holders for six bottles will be presented at any given time to the operator on the front side of the machine, thus affording ample time and opportunity for taking off the washed bottles and replacing them with unwashed bottles.

The form of machine hereinbefore described operates as follows: Bottles being placed in the carrier on the front side of the machine in an inverted position, as indicated in Fig. 1, and the driving-pulley J being set in motion by shifting the main driving-belt upon the tight pulley $j$, the several brushes are rapidly rotated, the rubber brushes being driven at a much higher rate of speed than the bristle brushes, the bottle-carrier is moved up and down once to every revolution of the crank-wheel H and is turned every time it is elevated above the muffs Q an interval equal to twice the distance between adjacent brushes or nozzles. The rotary movement of the carrier is arrested when the bottles are directly over and in line with the brush-spindles D and the nozzles R by the engagement of one of the bolts $u$ with the socket in the collar $p$. The carrier then descends, bringing the lower chucks O above the muffs Q into engagement with the cones on the upper ends of said muffs, which exactly center and securely hold the chucks and the bottles held therein in exact line with the brushes, around which they descend and by which they are washed. Four bottles are brushed at the same time, two by the bristle brushes and two by the rubber brushes. The bristle brushes scrub and remove the dirt adhering to the bottoms of the bottles, while the rubber brushes by their centrifugal action rub and remove the dirt from the necks and sides of the bottles as they descend and rise with the carrier. Immediately after the chucks O are seated upon the cones at the upper ends of the muffs Q the cam $h$ thrusts the rod $g^2$ backward and opens the valve $g$, thereby admitting water from the supply-pipe G into the header F and thence into the tubular brush-spindles D and the nozzles R. Water is thus injected into the bottles while they are being brushed and the foreign matter set free by the brushes is carried off with the water through the mouths of the bottles, drain-grooves being formed for this purpose in the chucks O, as shown in Fig. 7. After passing the brushes the bottles are carried over the nozzles R and thoroughly rinsed. Each bottle in its circuit through the machine is first scrubbed by a bristle brush and then by a rubber brush, or vice versa, and is finally rinsed. Just before the cam $s^2$ engages the projection $s^3$ on the arm S to turn the carrier an interval forward the cam $u^3$ engages the foot $u^2$ and thrusts the rod U upward, thereby disengaging the bolt $u$ directly above it from the collar $p$ and releasing the carrier. The muffs Q, descending and rising with the bottle-carrier, guide the brush-spindles as they enter the bottles and when the bottles are withdrawn draw the bristles and rubbers of the brushes into a small compass and hold them in readiness to enter the contracted mouths of other bottles.

Figures 9, 10:
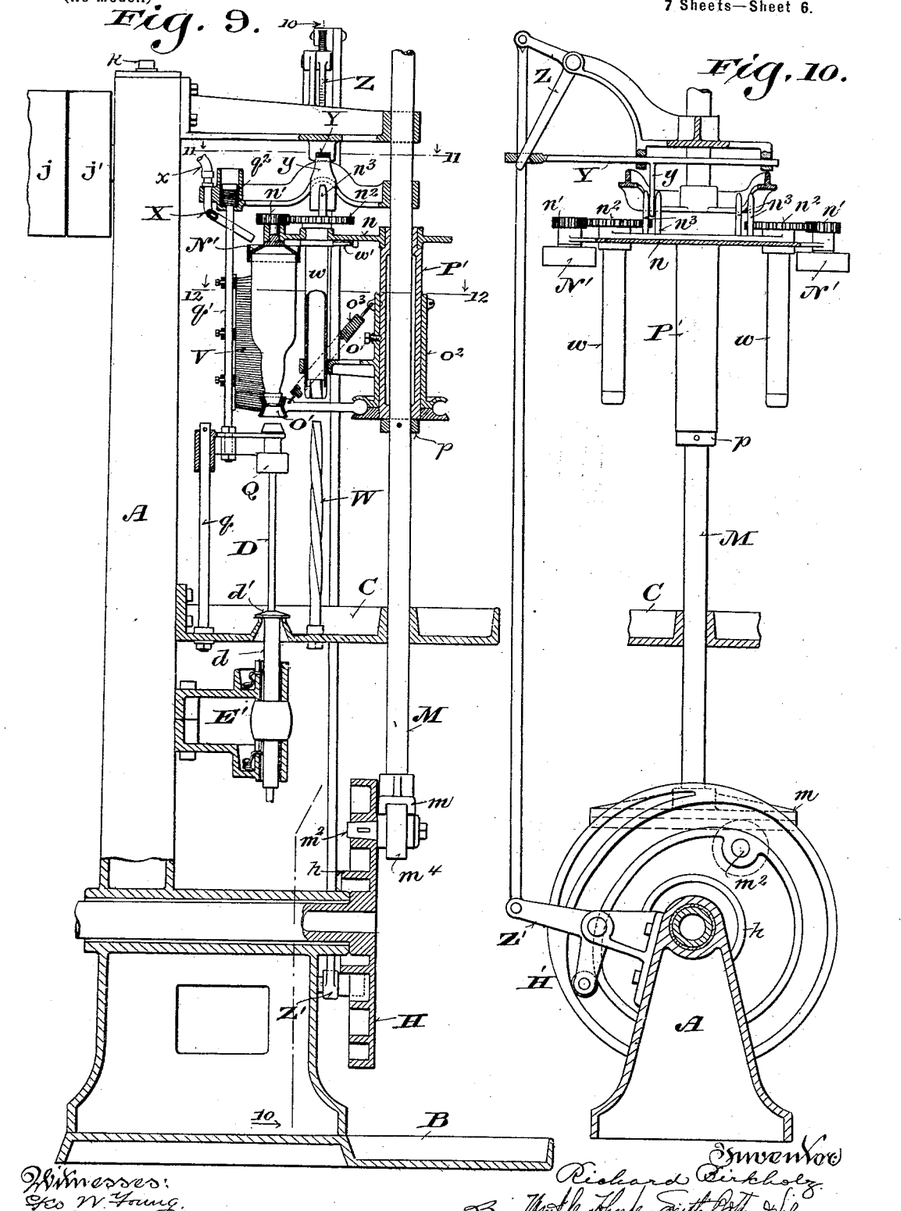
Fig. 9 is a central vertical section of a modified form of the machine.
Fig. 10 is a similar section taken in a plane indicated by the line 10 10 on Fig. 9 at right angles to the section plane of that figure.
Figure 11:
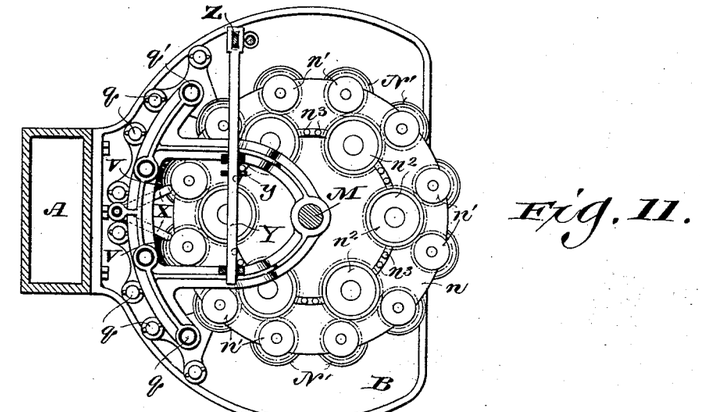
Fig. 11 is a horizontal section on the line 11 11, Fig. 9.
Figure 12:
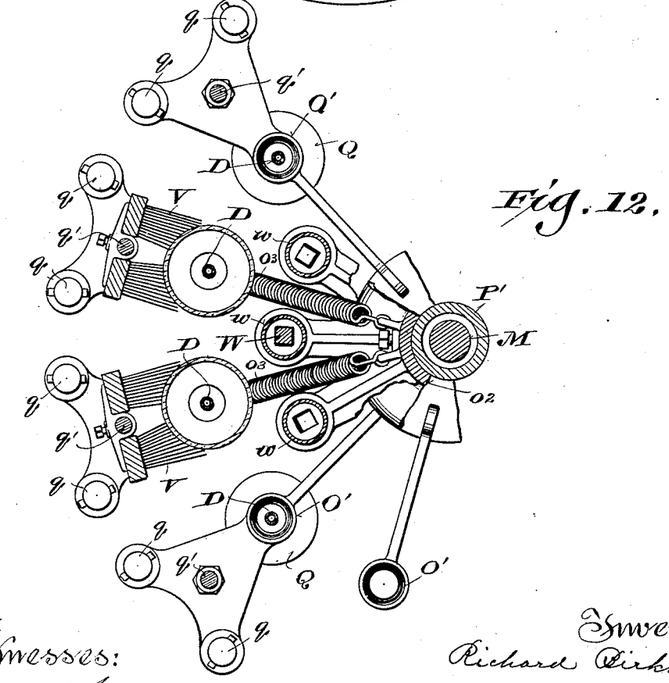
Fig. 12 is an enlarged section on the line 12 12, Fig. 9.

Referring to Figs. 9 to 12, inclusive, showing certain modifications of the machine hereinbefore described, particularly for washing the outside of bottles, V V are vertically-disposed brushes shaped to correspond with the outside of the bottles to be washed in the direction of their length and attached, as shown in Figs. 9 and 12, to rods $q'$, by which the muffs Q are moved up and down with the bottle-carrier. In this form of the machine, for the purpose of turning the bottles as they are brought opposite and into contact with the relatively stationary brushes V, the upper chucks N', which receive the bottoms of the bottles, are revolubly mounted in a plate or frame $n$, which is rigidly attached to the upper end of the sleeve P'. The chuck-journals are provided at their upper ends with pinions $n'$, which mesh with gears $n^2$, mounted upon the upper ends of tubes $w$, which have bearings at their upper ends in the plate or frame $n$ and near their lower ends in arms on a collar $o^2$, surrounding and vertically adjustable upon the sleeve P'. The tubes $w$ are provided in their lower ends with female spirals, which are adapted to be engaged and turned by a male spiral W, secured at its lower end in the table C in position to turn the bottles as they are brought into contact with the brushes V when the bottle-carrier is lowered and raised. The chucks N' are made cup-shaped or formed with marginal flanges on the upper side and are perforated inside of said flanges, so as to catch and direct water against the bottoms and outer sides of bottles held in said chucks. X is a branched nozzle or spout carried by the frame, with which the rods $q'$ are connected at their upper ends, in position to supply water to the chucks N' as they are brought by the carrier opposite the brushes V. This spout or nozzle is connected by a flexible hose $x$ with a suitable water-supply, preferably with the pipe or header F, so that the valve $g'$, which controls the supply of water to the tubular brush-spindles D and rinsing-nozzles R, will admit water to said chucks only when the bottles held therein are turned in contact with the brushes V. Springs $w'$, attached to the plate or frame $n$ and bearing against the tubes $w$, as shown in Fig. 9, afford sufficient frictional resistance to their rotation to hold them as they are raised by the bottle-carrier out of engagement with the fixed spiral W, in position to properly engage with it again when the associated bottle-holders next come opposite the brushes V. In this form of the carrier the upper chucks N' do not yield vertically, as in the arrangement shown in the preceding figures of the drawings and hereinbefore described, and to allow for the insertion of bottles in the carrier and variation in the length of bottles the lower chucks O' have jointed connections with the lower end of the collar $o^2$ and are yieldingly connected with the upper end of said collar by springs $o^3$, as shown in Figs. 9 and 12. The collar $o^2$ is adjusted vertically on the sleeve P' by means of the set-screw $o'$ for bottles of different sizes. This arrangement of the parts of the bottle-carrier is preferable to that first described, because the bottoms of the bottles, whatever variation there may be in their length or size, will have an invariable position in the carrier, and the action of the brushes which occupy invariable positions vertically will be more certain and effective, since the bottoms of all the bottles in the carrier will be lowered to the same extent into operative relation to the upper ends of the brushes. In place of the mechanism first described for intermittently turning the bottle-carrier the mechanism shown in Figs. 9, 10, and 11 may and will preferably be employed. A horizontal reciprocating bar Y is supported in bearings on the arm or bracket in which the rod M is guided at its upper end. It is provided on its under side with a depending plate $y$, which is adapted to be engaged successively by pairs of upwardly-projecting pins $n^3$ on the plate or frame $n$ when the bottle-carrier is moved into its upper position. Z is a bell-crank lever, one arm of which engages with the sliding bar Y and the other arm of which is connected with one arm of a bell-crank lever Z' at the lower end of the machine, as shown in Fig. 10. The crank-wheel H is formed in its rear face with a cam-groove, which engages with a friction-roller on the other arm of the lever Z' and is constructed to positively move the bar Y and turn the bottle-carrier forward when the lower chucks O' are lifted clear of the cones on the upper ends of the muffs Q and to turn said bar to its initial position when the bottle-carrier is lowered and the pins $n^3$ descend clear of the plate $y$. With this arrangement of mechanism for turning the bottle-carrier the locking-pins $u$ and the releasing-rod U shown in Fig. 8 are dispensed with, since the cam-groove in the wheel H' positively controls the movement of the bar Y, and the engagement of the pins $n^3$ with both sides of the plate $y$ on said bar positively limits the intermittent movement of the bottle-carrier in exactly the required position for the chucks O' to engage with the cones on the upper ends of the muffs Q and the spirals in the tubes $w$ to engage with the stationary spiral W. With the arrangement of the rotary brushes shown in the drawings two sets of stationary brushes are employed, as shown in Fig. 12, each set of stationary brushes operating upon alternate bottles in the carrier, which turns by intervals corresponding with the distance between alternate rotary brushes.

In both forms of the machine the bottles are carried down and up into and out of operative relation to the rotary brushes and are advanced when the bottle-carrier is raised by intervals, so as to bring the bottles successively over both rubber and bristle brushes and rinsing-nozzles. The connections for supplying water to the brush-spindles and rinsing-nozzles and the mechanism for rotating the brushes are the same in both forms of the machine and for this reason are not shown in Figs. 9 and 10.

The cones or tapered centering devices at the upper ends of the muffs or sleeves Q are made detachable, so that cones of different lengths may be used, according to the adjustment of the chucks O or O' for bottles of different sizes. The chucks O' are formed, as shown in Fig. 9, with inwardly-projecting ledges or shoulders to support the heads of the bottles, so that they will not wedge, but will turn freely in said chucks.

The crank-pin $m^2$ may be provided with a roller $m^4$, as shown in Figs. 9 and 10, in place of the block $m'$ for engagment with the yoke $m$. The number and relative arrangement of the brushes either for washing the bottles inside or for washing them outside and of the nozzles for rinsing the bottles after they are washed may be varied as desired, according to the varying conditions and requirements under which the machine is to be used. Some or all of the rinsing-nozzles may be supplied with hot water. The bottle-carrier and devices for washing bottles on the outside (shown in Figs. 1 to 12, inclusive) may be used in connection with the mechanism for turning the bottle-carrier and other parts of the machine shown in Figs. 1 to 8, inclusive. In short, various changes other than those specified may be made in the details of construction and in the arrangement of the parts of the machine without departing from the spirit and intended scope of my invention.

I claim—

1. In a bottle-washing machine, the combination of a series of rotary and axially-stationary brushes, a vertically-movable rotary bottle-carrier, means for intermittently lowering and raising said carrier so as to carry the bottles contained therein over the brushes and lift them clear of the brushes, and means for intermittently turning said carrier when it is raised clear of the brushes, so as to bring the bottles in succession directly over the brushes, substantially as described.

2. In a bottle-washing machine, the combination of axially-stationary rotary brushes, means for rotating said brushes, a vertically-movable rotary bottle-carrier provided with chucks for holding the bottles in an inverted position by the bottoms and heads, one of the chucks for holding each bottle being vertically yielding to allow for variations in the size or length of the bottles, means for lowering and raising said carrier intermittently and means for turning the same by intervals when it is raised clear of the brushes, substantially as described.

3. In a bottle-washing machine, the combination of a stationary table having a raised margin and a waste connection, a number of axially-stationary rotary brushes the spindles of which project upwardly through flanged openings in said table and are provided above said openings with deflecting-shields and below the table with pulleys, a vertically-movable rotary bottle-carrier, means for intermittently lowering and raising said carrier and means for turning the same when it is raised above the brushes, substantially as described.

4. In a bottle-washing machine, the combination of a number of axially-stationary rotary brushes, a vertically-movable rotary bottle-carrier, means for intermittently lowering and raising said bottle-carrier, means for turning the same when it is raised above the brushes, vertically-movable muffs through which the brushes are guided into the bottles when the carrier is lowered and into which they are withdrawn when the carrier is raised, and means for raising and lowering said muffs simultaneously with said carrier, substantially as described.

5. In a bottle-washing machine, the combination of a number of axially-stationary rotary brushes, a vertically-movable rotary bottle-carrier provided with a series of bottle-holders, means for intermittently lowering and raising said bottle-carrier, means for turning the same when it is raised above the brushes, muffs through which the brushes are projected into the bottles when said carrier is lowered and into which the brushes are withdrawn when the carrier is raised, and means for lowering and raising said muffs simultaneously with said carrier, said muffs and bottle-holders being provided with tapering centering devices which are brought into engagement with each other by the initial downward movement of the bottle-carrier and are separated by its terminal upward movement, substantially as described.

6. In a bottle-washing machine, the combination of a number of rotary brushes, a vertically-movable rod parallel with the brush-spindles, a bottle-carrier revolubly mounted upon said rod, means for intermittently lowering and raising said rod, means for intermittently turning said bottle-carrier when it is elevated above the brushes, vertically-movable muffs through which the brushes are projected into the bottles when the carrier is lowered, having a vertically-yielding connection with said rod and guided parallel with the brush-spindles, and stops for limiting the upward movement of the muffs before the bottle-carrier reaches the upward limit of its movement, substantially as described.

7. In a bottle-washing machine, the combination of a number of rotary brushes, a vertically-movable bottle-carrier provided with upper and lower chucks or holders for holding bottles in an inverted position, one set of chucks or holders being adjustable toward and from the other for bottles of different sizes, means for intermittently lowering and raising said carrier and means for turning the same when it is raised above the brushes, substantially as described.

8. In a bottle-washing machine, the combination of a number of rotary brushes, a vertically-movable rotary bottle-carrier provided with tapering chucks or holders for centering and holding bottles in an inverted position in said carrier, one set of chucks or holders being capable of yielding away from the opposing chucks or holders, to allow for variation in the length of bottles, means for permanently adjusting one set of chucks or holders toward and from the other, for bottles of different sizes, means for intermittently lowering and raising said bottle-carrier and means for turning the same when it is raised above the brushes, substantially as described.

9. In a bottle-washing machine, the combination of a number of rotary brushes having tubular spindles communicating at their lower ends with a header which has a water-supply connection, a valve controlling said supply connection, a vertically-movable rotary bottle-carrier, means for lowering and raising said carrier and for intermittently turning the same when it is raised, and means for opening the water-supply valve when said carrier is lowered, substantially as described.

10. In a bottle-washing machine, the combination of rotary brushes having tubular spindles connected at their lower ends with a water-pipe, a valve controlling the supply of water to said spindles, a vertically-movable rotary bottle-carrier, means for lowering and raising said bottle-carrier and intermittently turning the same when it is raised, vertically-movable muffs through which the brushes are projected into the bottles when said carrier is lowered and into which they are withdrawn when the carrier is elevated, said muffs being formed with chambers having waste-openings and means for lowering and raising said muffs simultaneously with the bottle-carrier, substantially as described.

11. In a bottle-washing machine, the combination of rotary bristle and centrifugal rubber brushes having tubular spindles connected with a valve-controlled water-supply, a vertically-movable rotary bottle-carrier and means for lowering and raising said carrier and intermittently turning the same when it is raised so as to bring the bottles therein contained successively into operative relation to the bristle and the centrifugal rubber brushes, substantially as described.

12. In a bottle-washing machine, the combination of a series of rotary brushes made of different materials, a bottle-carrier adapted to move bottles held therein into position to be operated upon successively by different brushes, and means for rotating said brushes at different rates of speed, substantially as described.

13. In a bottle-washing machine, the combination of a series of rotary bristle brushes and centrifugal rubber brushes, a carrier for holding bottles, means for moving said carrier intermittently so that each of the bottles contained therein will be operated upon successively by the bristle and rubber brushes, and means for rotating said brushes at different rates of speed, substantially as described.

14. In a bottle-washing machine, the combination of a series of brushes, some of which are provided with bristles and others with centrifugal rubber wipers having tubular stems connected with a valve-controlled water-supply, a bottle-carrier adapted to hold bottles in position to be washed inside by said brushes, means for moving said carrier intermittently so that each bottle will be washed in succession by bristle and rubber brushes, means for rotating the rubber brushes at a high rate of speed and the bristle brushes at a lower rate of speed, and means for opening the valve controlling the water-supply to the brushes when the bottles are brought by the carrier into operative relation to the brushes, substantially as described.

15. In a bottle-washing machine, the combination of a series of rotary brushes having tubular stems and one or more injecting-nozzles having a valve-controlled water-supply connection, a vertically-movable rotary bottle-carrier, means for lowering and raising said carrier and intermittently turning the same so as to successively move the bottles held in said carrier into operative relation to said brushes and nozzle or nozzles, and means for opening the valve in the water-supply connection and admitting water to the brushes and nozzle or nozzles when the bottles are brought by the carrier into position to be washed and rinsed, substantially as described.

16. In a bottle-washing machine, the combination of a series of rotary brushes having vertical spindles, provided with pulleys, a vertically-movable rotary bottle-carrier, means for lowering and raising said carrier and for turning the same intermittently when elevated, a driving-pulley and a single belt passing around said driving-pulley, an idler arranged transversely thereto, thence successively around the pulleys on the brush-spindles, thence around another idler parallel with the first-mentioned idler, thence around another pulley below the last-mentioned idler, and thence back to the driving-pulley, substantially as described.

17. In a bottle-washing machine, the combination of a number of rotary brushes, an axially-movable vertical rod, a bottle-carrier revolubly mounted upon said rod and vertically movable therewith, a crank for intermittently lowering and raising said rod, and means for intermittently turning said carrier, substantially as described.

18. In a bottle-washing machine, the combination of a number of rotary brushes having vertically-disposed spindles provided with pulleys, a vertically-movable rod parallel with the brush-spindles, a bottle-carrier revolubly mounted upon said rod, a crank for intermittently lifting said rod and bottle-carrier, a driving-pulley carried by the upper part of the machine, another pulley carried by the lower part of the machine at right angles to the driving-pulley and connected with the crank-shaft by a worm and gear, and a single belt passing over the driving-pulley, thence around the pulley at the lower end of the machine, thence upwardly over an idler, thence around the pulleys on the brush-spindles, thence around another idler parallel with the first idler, and thence back to the driving-pulley, substantially as described.

19. In a bottle-washing machine, the combination of a number of rotary brushes, an axially-movable rod parallel with the brush-spindles, a bottle-carrier revolubly mounted upon said rod, means for intermittently lifting said rod and carrier, a horizontally-reciprocating bar provided with a depending plate, and means for moving said reciprocating bar back and forth at the proper intervals to cause said plate to engage successively with a series of projections on said carrier and to turn said carrier intermittently forward when it is elevated, substantially as described.

20. In a bottle-washing machine, the combination of a number of rotary brushes, an axially-movable rod parallel with the brush-spindles, a bottle-carrier revolubly mounted upon said rod, means for intermittently lowering and raising said rod and carrier, which is provided with a series of pairs of projections, a horizontally-reciprocating bar provided with a depending plate adapted to be engaged on each side by a pair of projections when the carrier is elevated, and a cam having an operating connection with said bar and adapted to move the same in one direction when the plate thereon is engaged with projections on the carrier, and to move the same in the other direction when said projections are lowered clear of said plate, substantially as described.

21. In a bottle-washing machine, the combination of a brush, a rotary bottle-holder movable parallel with said brush, a tube having a spirally-twisted bore and a spiral rod fitting the bore of said tube, one being carried by and geared with said bottle-holder, and the other being fixed to a stationary support in the path of said tube, substantially as described.

22. In a bottle-washing machine, the combination of a vertically-movable rotary bottle-carrier provided with rotary bottle chucks or holders, a brush adapted to wash bottles outside, means for intermittently moving said bottle-carrier up and down and turning the same when elevated so as to bring the bottles held therein successively into contact with said brush, spirals arranged parallel with the axis of the carrier and geared with said bottle-holders, and a fixed spiral arranged to be engaged by and to turn the spirals on said carrier as the associated bottles are brought into contact with said brush, substantially as described.

23. In a bottle-washing machine, the combination of a brush shaped to correspond approximately with the bottles to be washed on the outside, a vertically-movable rotary carrier provided with rotary chucks or holders flanged on the upper side and perforated to hold and direct water against the bottles, means for intermittently lowering and raising said carrier and turning the same when it is elevated, means for turning said chucks or holders, and a connection for supplying water to said holders when the bottles therein are in contact with said brush, substantially as described.

24. In a bottle-washing machine, the combination of rotary brushes having vertically-disposed tubular spindles, a vertically-movable rotary bottle-carrier provided with rotary chucks or holders flanged on the upper side and perforated to hold and direct water against the outside of the bottles contained therein, a brush with which the bottles in said carrier are brought successively into contact on the outside, means for turning said chucks or holders when the bottles contained therein are brought into engagement with said last-mentioned brush, and means for supplying and admitting water to said brush-spindles and to said chucks or holders as bottles are brought by said carrier into operative relation to said brushes, substantially as described.

25. In a bottle-washing machine, the combination of a brush adapted to wash bottles on the outside, a longitudinally-reciprocating and rotary bottle-carrier for holding bottles in position to be washed by said brush, and means for intermittently reciprocating and turning said bottle-carrier, substantially as described.

26. In a bottle-washing machine, the combination of rotary brushes, a rotary bottle-carrier movable parallel with the brush-spindles, means for intermittently moving said carrier axially, a reciprocating bar provided with a transverse plate and means for moving said bar back and forth at the proper intervals to cause said plate to engage successively with a series of projections on said carrier and to turn said carrier forward when it is moved axially away from the brushes, substantially as described.

In witness whereof I hereto affix my signature in presence of two witnesses.

RICHARD BIRKHOLZ.

Witnesses:
CHAS. L. GOSS,
M. L. EMERY.